United States Patent [19]

Yanagisawa et al.

[11] Patent Number: 4,523,670
[45] Date of Patent: Jun. 18, 1985

[54] WORKPIECE TRANSFERRING APPARATUS

[75] Inventors: Taminori Yanagisawa, Toyota; Takaharu Yamaguchi, Toyokawa; Hiroshi Fukatsu, Toyota, all of Japan

[73] Assignees: Toyota Jidosha Kabushiki Kaisha; Taihoo Seiki Co., Ltd., both of Toyota, Japan

[21] Appl. No.: 469,512

[22] Filed: Feb. 24, 1983

[30] Foreign Application Priority Data

Mar. 5, 1982 [JP] Japan .................. 57-030342[U]

[51] Int. Cl.³ ............................................. B65G 47/24
[52] U.S. Cl. .................................... 198/403; 414/758
[58] Field of Search ............... 198/403, 409, 411, 413, 198/404; 414/758, 762, 763, 765, 773

[56] References Cited

U.S. PATENT DOCUMENTS

| 2,293,192 | 8/1942 | Campbell | 414/763 |
| 2,772,766 | 12/1956 | Kellam | 198/403 |
| 3,072,266 | 1/1963 | Holcroft | 414/773 X |
| 3,308,969 | 3/1967 | Orms et al. | 198/403 X |
| 3,895,722 | 7/1975 | Pluntz | 198/403 |

FOREIGN PATENT DOCUMENTS 2744793  4/1979  Fed. Rep. of Germany ...... 198/403

Primary Examiner—Robert J. Spar
Assistant Examiner—Douglas C. Voorhees
Attorney, Agent, or Firm—Kenyon & Kenyon

[57] ABSTRACT

A reversible drive device rotates a sprocket wheel so that an endless chain engaging said sprocket wheel moves through a vertical path and then in a semicircular path around a chain guide. A workpiece conveyed by a conveyor device from a preceding stage is clamped by a clamping device extending from a base end of a workpiece retaining arm having an outer end connected to said chain. If the workpiece is to be transferred in an inverted orientation, a slider pivotally supporting the base end of the workpiece retaining arm is raised along a slide guide by the chain; then the outer end of the workpiece retaining arm circles around the upper end of the chain guide together with the chain, thereby rotating the workpiece retaining arm by half a turn and inverting the workpiece. The workpiece retaining arm is then lowered after the circling, the workpiece is unclamped and transferred to a conveyor device leading to a subsequent stage, and the reversible drive device is reversed by operation of a position detection device so that the workpiece retaining arm is returned to its initial position. If the workpiece is to be transferred in a noninverted orientation, the chain drive is reversed by a limit switch before the workpiece retaining arm reaches the semicircular part of the chain path, so that the workpiece retaining arm translates vertically only.

11 Claims, 11 Drawing Figures 4,523,670

WORKPIECE TRANSFERRING APPARATUS

BACKGROUND OF THE INVENTION (1) Field of the Invention

This invention relates to a workpiece transferring apparatus having a clamping device which receives a workpiece from one conveyor device provided in a stage subsequent to a machining device or the like, to transfer the workpiece to another conveyor device leading to the following stage in such a manner that the workpiece may be selectively inverted in its orientation, and further having a workpiece retaining arm engaged with an inverting device. More particularly, the invention relates to a workpiece transferring apparatus wherein an endless chain engaged with a sprocket wheel which is supported in a frame and is connected to a reversible drive device to enable the chain to conduct rectilinear motion and also circular motion, in engagement with a chain guide having a circular-arc, wherein a base of a workpiece retaining arm, the arm having an outer end connected to said chain, is enabled to conduct a straight rise or a circular rotation in engagement with a slider sliding vertically along a slide guide provided at the frame, wherein a clamping device fixed monolithically to the base of said workpiece retaining arm is enabled to clamp and unclamp the workpiece, and wherein a position detection device, such as a limit switch, connected electrically to the reversible drive device is enabled to contact a dog on a workpiece retaining arm and to alter its position with respect to the frame.

(2) Description of the Prior Art

As is known well, a machining device for pressing and the like constitutes one process in a consecutive production line, and accordingly, a transfer through a plurality of stages is usually executed to optimize the process of passing the workpieces.

There are some cases where a workpiece is transferred with the same orientation from one stage of one machining process to the stage of the subsequent machining process. However, sometimes it becomes necessary to conduct the transfer with the workpiece in an inverted orientation.

When the inversion of the workpiece is conducted at an intermediate stage, for instance, a rotating device having an impeller or a rack and pinion mechanism is arranged for this purpose. For a workpiece which requires no inversion, a change of stage is sufficient for workpieces whose shape is within certain limits. However, for a workpiece whose shape has changed beyond these limits, an intermediate stage transferring device must be provided separately, and the apparatus becomes complicated by the additional provision of the substage. These necessities lead to a need for numerous and cumbersome controlling measures, while the increased number of processes for changing stages brings about the disadvantages of lowered efficiency of the production line and an increase in the cost.

SUMMARY OF THE INVENTION

The first purpose of the present invention is to solve the problems of intermediate transfer of a workpiece based on the above prior art. The second purpose of this invention is to enable optional inversion or non-inversion transfer and also alteration of the height at which the workpiece is held by enabling reversible movement of a sprocket-engaging endless chain connected to a reversible drive device, by enabling both vertical translation and circular rotation of a workpiece retaining arm connected to said chain, and by varying the location of position detection devices, such as limit switches, in relation to a dog on said workpiece retaining arm to enable the selection of vertical moton alone or of a vertical and circular motion. Furthermore, the third purpose of the present invention is to furnish an excellent workpiece transferring apparatus which can contribute to the field of manufacturing industries wherein the transfer of workpieces is conducted.

DESCRIPTION OF THE PREFERRED EMBODIMENTS

Figure 1:
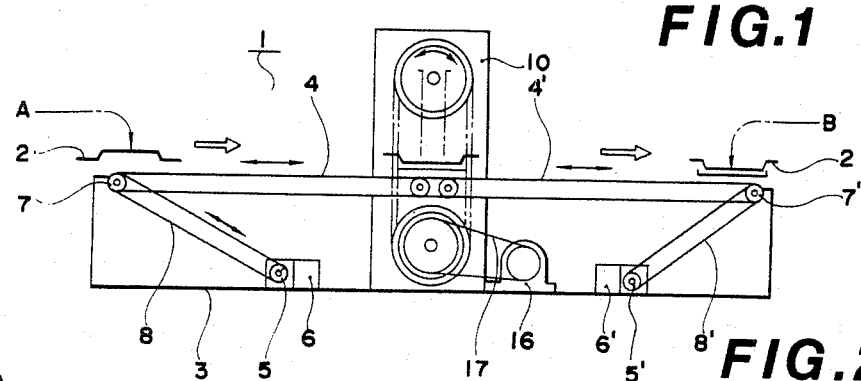
FIG. 1 is a schematic front view of the complete apparatus.
Figure 2:
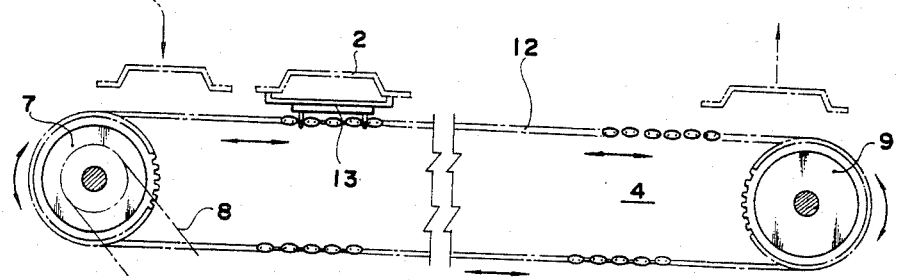
FIG. 2 is an explanatory drawing of the conveyor device of the first stage.
Figure 3:
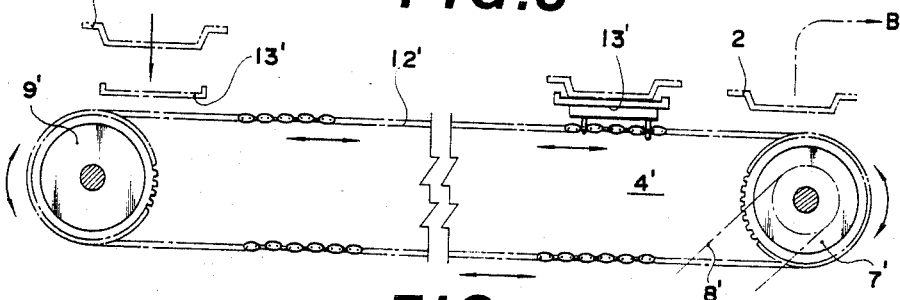
FIG. 3 is an explanatory drawing of the conveyor device of the third stage.
Figure 4:
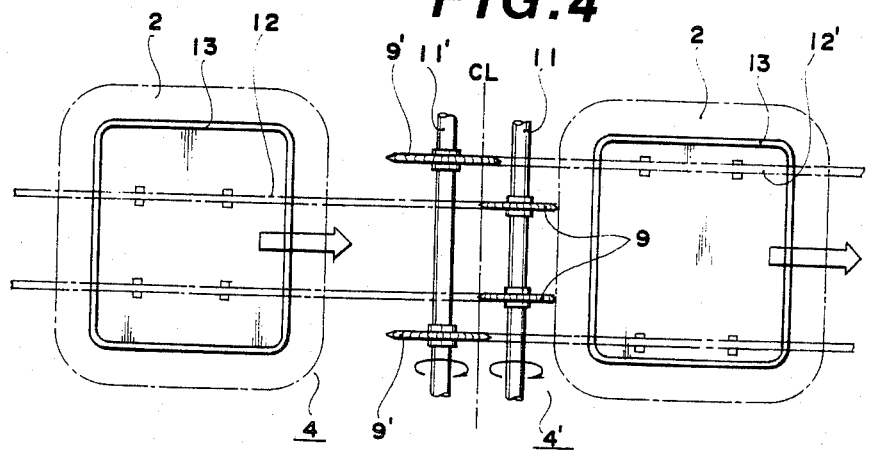
FIG. 4 is an explanatory plan view of the connection between said two conveyor devices.
Figure 5:
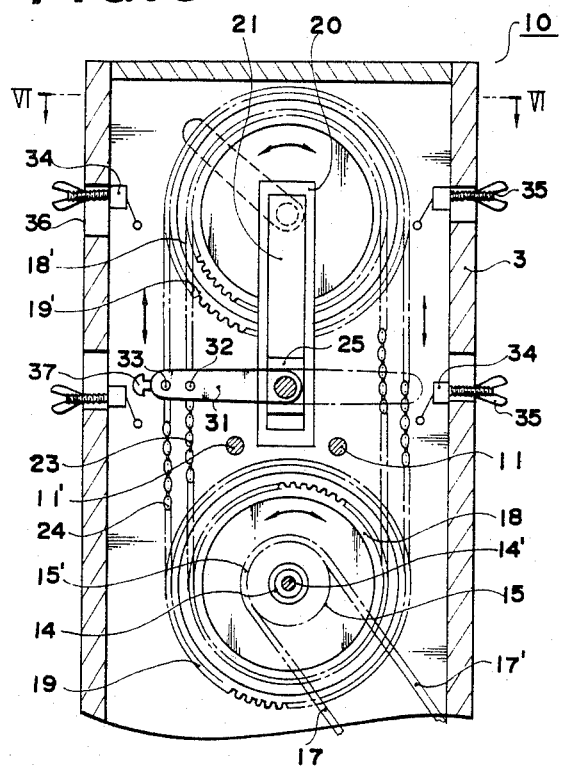
FIG. 5 is an explanatory front view of one embodiment of a transferring device.
Figure 6:
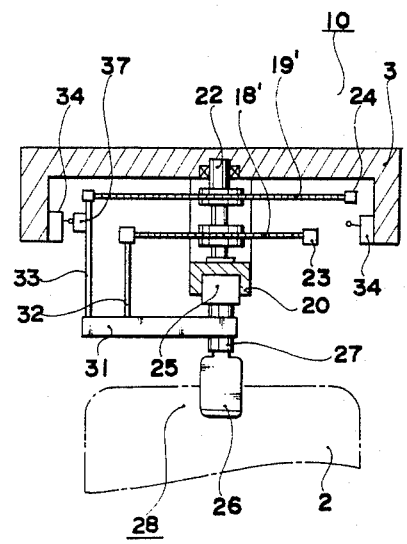
FIG. 6 is section taken along the line VI—VI of FIG. 5.
Figure 8:
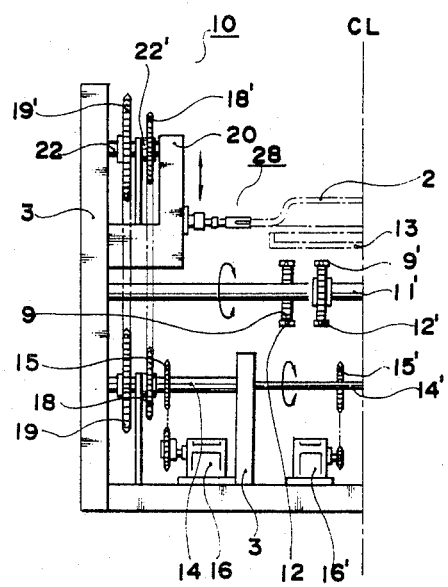
FIG. 8 is an explanatory side view of the mechanism.
Figure 7:
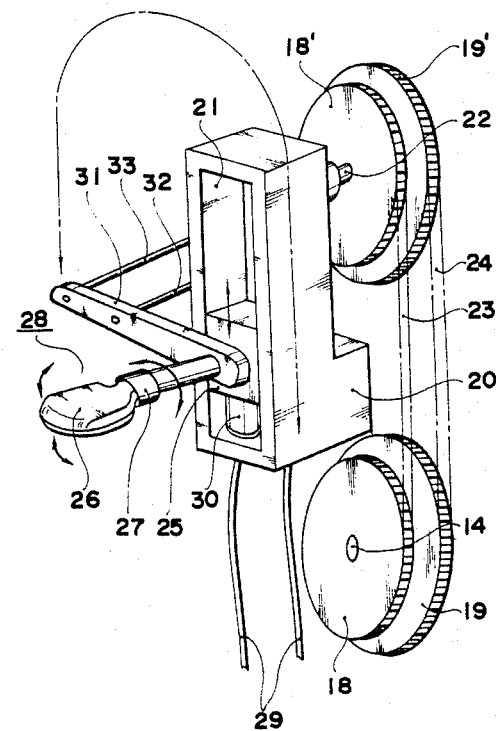
FIG. 7 is an explanatory perspective view of the principal parts.

In an embodiment shown in FIGS. 1 to 8, numeral 1 is a transferring device, which is devised, as shown in FIG. 1, to deliver a workpiece 2 sent from a press device in the preceding stage (not shown in the figure) on the left to a press device in the subsequent stage on the right (also not shown in the figure). A frame 3 is provided with conveyor devices 4, 4' consisting of right and left chain conveyors, which are devised so that driving sprocket wheels 7, 7' at both ends are driven normally or reversely by chains 8, 8' through reversible motors 6, 6' with speed reduction devices 5, 5' which serve as reversible drive devices.

Follower sprocket wheels 9, 9' of said conveyor devices 4, 4' are provided on shafts 11, 11' pivotally supported by the frame 3 of a workpiece transferring apparatus 10 which is installed in the center, constituting an essential device of the present invention. These sprocket wheels 9, 9' are provided in such a manner that they overlap the center line CL on both sides thereof, while conveyor chains 12, 12' are stretched between the driving sprocket wheels 7, 7'.

Workpiece receivers 13, 13' each having a prescribed size smaller than that of the workpiece 2 are provided on the upper flights of the conveyor chains 12, 12', being fixed thereto by pins.

Driving sprocket wheels 15, 15' are fixed to shafts 14, 14' which are rotatably supported in the lower part of the frame 3 of the workpiece transferring apparatus 10 and which can rotate relatively and concentrically with respect to each other, and these sprocket wheels are devised so as to be rotated, with some difference in speed, by chains 17, 17' stretched between them and the reversible drive motors 16, 16'.

Sprocket wheels 18 and 19 which have different diameters are fixed on said shafts 14, 14', respectively.

The frame 3 is provided monolithically with a slide guide 20 having an L-shaped elevation, and a guide groove 21 is formed vertically inside this guide, while follower sprocket wheels 18' and 19' having the same diameters as the respective sprocket wheels 18 and 19 and serving as chain guides are freely rotatable on a shaft 22, 22' stretched between the upper parts of the guide groove and the frame. Chains 23 and 24 are stretched between said sprocket wheels 18, 18' and 19, 19', respectively, and the motors 16, 16' are devised to be operated by a control device (not shown in the figure) either to drive the chain 23 at the same linear speed as the chain 24 or to rotate the sprocket wheels 18, 18' at the same angular rate as the sprocket wheels 19, 19'.

Numeral 25 is a slider which slides vertically in the guide groove 21 of the slide guide 20 and supports pivotally and rotatably a clamping device 28 having an appropriate cylinder clamping mechanism 27 provided with a pair of clamps 26 at the end, and a cylinder 30 connected to pipes 29 is attached to a solenoid valve so that said cylinder clamping mechanism 27 is operated to open and close the clamps 26 alternately when said slider 25 reaches the bottom of the guide groove 21.

A workpiece retaining arm 31, having a base which is attached monolithically to said clamping device 28 and which serves an an inverting device, has an outer end that is linked to the chains 23 and 24 by pins 32 and 33, respectively.

When the chains 23 and 24 are driven at the same speed, as described later, the workpiece retaining arm 31 translates vertically while being kept horizontal as the slider 25 moves vertically inside the guide groove 21. When the slider reaches the top of the notch, the workpiece retaining arm 31 can be made to conduct a semi-circular turn at the upper end by driving the sprocket wheel 18 at the same angular rate as the sprocket wheel 19.

Four limit switches 34 serving as position detection devices, a first lower and a first upper limit switch being located on one side of the frame 3 and a second lower and a second upper limit switch on the other, are provided in such a manner that their vertical positions can be adjusted along adjustment slots 36 by screws 35. The limit switches are connected to the reversible drive motors 16, 16' by lead wires (not shown in the figures) through a solenoid control device for the cylinder clamp (not shown in the figures) and are positioned to contact a dog 37 provided on the outer pin 33 of the workpiece retaining arm 31.

The four limit switches 34, which operate to control the reversible drive motors 16, 16' and the clamping device 28, are provided in such a manner that their positions can be adjusted in the vicinity of the upper and lower ends of the guide groove 21.

The conveyor devices 4, 4' and the transfer apparatus 10 are designed to conduct accurate synchronous operations for the transfer of the workpiece by means of the control device (not shown in the figures) and the chains 8, 8' and 17, etc.

If it is desired to invert the workpieces during the transfer operation, the motors 16, 16' are controlled by the control device so that the chains 23 and 24 move at the same linear speed when the workpiece retaining arm 31 is between the lower and upper limit switches 34, whereas the sprocket wheels 18 and 19 rotate at the same angular speed so that the arm 31 makes a smooth circling movement around the stationary slider 25 when the arm 31 is between the upper limit switches 34.

In the above operating mode, the lower limit switches 34 are set at positions which are appropriate for the workpieces on the workpiece receivers 13, 13' of the conveyor devices 4, 4'; the workpiece retaining arm 31, i.e., the clamping device 28, is set at a lower level; and the clamps 26 are opened so that they are ready for use.

Meanwhile, the first upper limit switch 34 is displaced to and set at the upper end of the corresponding notch 36 so that this switch does not make contact with the dog 37 until the slider 25 reaches the top of the guide groove 21.

When the control device is operated in synchronism with the operation of the press device, each workpiece 2 is passed along the path A by a transfer device (not shown in the figures) and is delivered to a workpiece receiver 13 standing by at the first stage of the conveyor device 4.

When the reversible drive motor 6 is started at a prescribed time, the conveyor chain 12 moved by the chain 8 and the sprocket wheel 7 conveys the workpiece 2 together with the workpiece receiver 13 to the right. At the end of the stroke the edge of the workpiece 2 enters between the waiting opened clamps 26. Then the clamps 26 are closed so as to clamp the workpiece 2 by the cylinder clamping mechanism 27 operated by the control device (not shown in the figures), which is operated by the action of a limit switch (not shown in the figures). At the same time, the reversible motor 6 reverses, and the chain 12 is thereby moved back to return the workpiece receiver 13 to the first stage side. The reversible drive motors 16, 16' start to rotate each of the shafts 14, 14' at a set angular velocity via the chains 17, 17' and the sprocket wheels 15, 15', while the reversible motor 6' is operated to turn the conveyor chain 12' counterclockwise. As a result, the sprocket wheels 18 and 19 rotate, so that the sprocket wheels 18' and 19' are simultaneously driven, each at its set angular velocity, through the chains 23 and 24.

The angular velocities of sprocket wheels 18 and 19 are set so that the chains 23 and 24 move at the same linear speed when the workpiece retaining arm 31 is between the upper and lower limit switches 34, so that the workpiece retaining arm 31, the orientation of which is fixed by the chains 23 and 24 via the pins 32 and 33, is raised with its orientation kept horizontal, while the slider 25 also slides upward smoothly within the guide groove 21. The dog 37 on the retaining arm 31 strikes the first upper limit switch 34 at the top of the stroke of the slider 25, and the speed of the motors 16, 16' is changed thereby through the control device so that the sprocket wheels 18' and 19' turn at the same angular speed. Therefore, said workpiece retaining arm 31 circles half a turn around the slider 25, turning the clamp device 28 also through half a turn, and as a result, the workpiece 2 is inverted.

The dog 37 then strikes the second upper limit switch 34 at the far end of the semicircular path of the chains 23 and 24, the chains 23 and 24 are thereby caused to be driven at the same speed, and the workpiece retaining arm 31 is lowered with its orientation again kept horizontal. The dog 36 on the pin 33 strikes the second lower limit switch 34, causing the clamps 26 of the clamping device 28 to open through the control device. The inverted workpiece 2 is delivered thereby onto the waiting workpiece receiver 13' on the conveyor chain 12' of the conveyor device 4' which has been rotated to the left and stopped just before this time. The motors 16, 16' are also caused to reverse so as to drive the chains 23 and 24 in the reverse direction to return the workpiece retaining arm 31 to its initial position. The dog 37 then strikes the first lower limit switch 34, the reversible drive motors 16, 16' are thereby stopped, and the clamps 26 are opened to wait to clamp the next workpiece.

Meanwhile, the conveyor device 4' loaded with the workpiece 2 is moved by the reversible motor 6', and the workpiece receiver 13' reaches its stroke end. In the third stage, the workpiece 2 is passed along the path B by a transferring device (not shown in the figures) and is placed into the press device of the subsequent stage. The reversible motor 6' is then operated in reverse by a limit switch (not shown in the figures) to move the conveyor chain 12' back again. This returns the transferring device to its waiting position by the second stage transferring apparatus 10, and the reversible motor 6' is stopped.

The above cycle is repeated according to the press operation in a periodic manner.

There are times when it is desired to convey the workpiece 2 in the same orientation without being inverted from the first stage to the third stage. In this case, the first upper limit switch 34 is lowered down the slot 36 so that the dog 37 strikes said limit switch 34 before the workpiece retaining arm 31 reaches the top of the guide groove 21. The contact with said limit switch causes the reversible drive motors 16, 16' to reverse, so that the workpiece retaining arm is raised and then lowered between the first lower and upper limit swtiches 34 with its orientation kept completely horizontal. When it is lowered again, the clamps 26 are opened by the operation of the first lower limit switch 34 to deliver the workpiece 2 onto the workpiece receiver 13' of the conveyor device 4', which has been returned to its waiting position. The change in function of the first upper limit switch from changing the speed of drive motors 16, 16' to changing their direction is accomplished by conventional switching means (not shown).

In the above case, the raising and lowering of the workpiece retaining arm 31 through the workpiece clamp is useful also for avoiding interference between the workpiece receivers 13, 13' of the conveyor devices 4, 4'.

Figure 9:
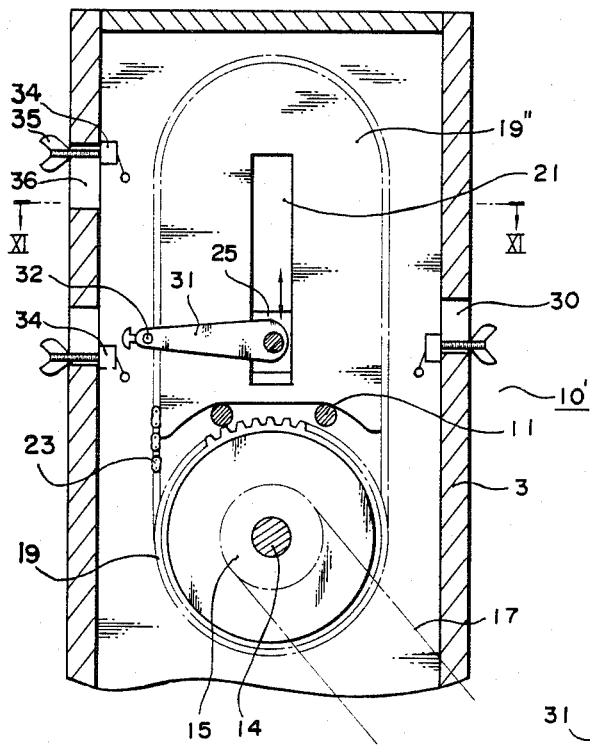
FIG. 9 is an explanatory drawing of another embodiment, corresponding to FIG. 5.
Figure 10:
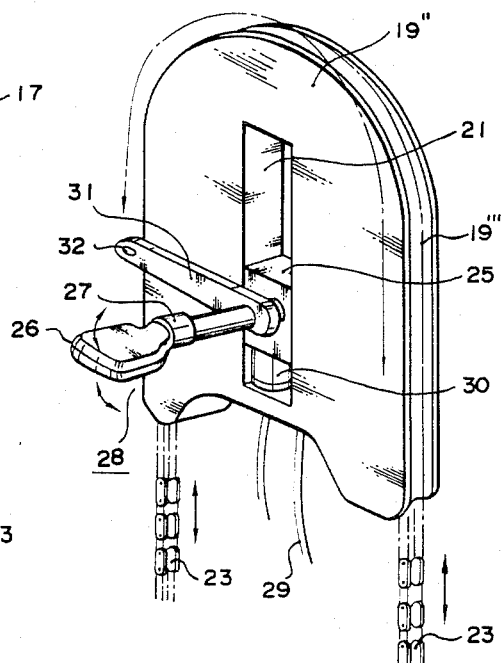
FIG. 10 is an explanatory drawing of the above embodiment, corresponding to FIG. 7.
Figure 11:
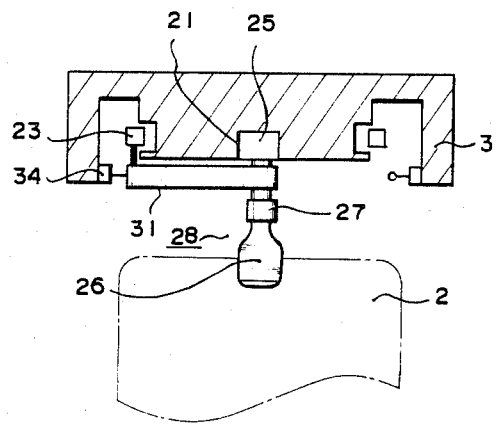
FIG. 11 is an explanatory drawing of the above embodiment, corresponding to FIG. 6.

The embodiment shown in FIGS. 9, 10, and 11 is a simplification of the above embodiment. The lower half of a chain guide 19" of a transferring apparatus 10', which also serves as a slide guide, is formed with parallel vertical sides, while the upper half thereof is formed in a half circle, and a concave guide groove 19''' is provided on the outer peripheral surface thereof, which guide groove engages with an endless chain 23 engaging with a sprocket wheel 19 at a lower position. The outer end of the workpiece retaining arm 31 is linked to the chain 23 in a cantilever manner by the pin 32, while the base end thereof is pivotally supported by the slider 25 which slides vertically on the guide groove 21 provided in said chain guide 19" serving also as the slide guide.

Accordingly, the workpiece retaining arm 31 can be raised together with the slider 25 in accordance with the movement of the chain 23 when the weight of the workpiece 2 clamped by the clamping device 28 is small. When the weight of the workpiece is large, however, the elevation and rotation thereof becomes difficult, since a large moment acts on the base and outer ends of the workpiece retaining arm 31. In this case, it is necessary to reduce, by means of a recess or the like, the large frictional force acting between the slider 25 and the guide groove 21, and between the chain 23 and the guide groove 19''' of the chain guide 19".

It is needless to say that the mode of application of the present invention is not limited to the above embodiments. Various modifications such as, for instance, the provision of photoelectric detection devices or the like instead of the limit switches, can be adopted, and this mode of conveyance can also be applicable, of course, to sorting or printing work, etc., as well as for employment between pressing and machining stages.

As mentioned above, the present invention has an excellent effect in that, in a workpiece transferring apparatus provided between conveyor devices of two stages, a chain of a sprocket wheel connected to a reversible drive device is made to be in contact around and engage with a chain guide located above the sprocket wheel, so that a workpiece retaining arm having an outer end connected to the chain and a base end pivotally supported by a slider in sliding contact with a slide guide can translate vertically and circle around the upper part of the chain guide, thus enabling a workpiece clamping device that projects from the base end of said workpiece retaining arm to be raised, inverted and lowered, whereby a workpiece coming from the first stage can be inverted and conveyed to the subsequent stage.

Moreover, the workpiece retaining arm can be made to not follow the above described circling stroke by changing the position of a limit switch controlling the direction of the chain drive, which brings about the excellent effects that the workpiece can be delivered in the same orientation without being inverted from one conveyor device to the other, and that interference between workpiece receivers of the two conveyor devices can be avoided.

Furthermore, there is yet another effect that the stroke length of the workpiece retaining device can be adjusted by changing the locations of the position detection devices, to allow for differences in the installation levels of the two conveyor devices and of mounting conditions on site.

In this way, the present invention has the merit that a single intermediate workpiece transfer apparatus enables various transfers of the workpieces, thereby avoiding the need for a plurality of equipment, enabling a reduction of the number of changes in the stages, improving the operational capability, and improving the efficiency of the line.

What is claimed is:

1. An apparatus for transferring a workpiece from a first conveyor device leading from one manufacturing stage to a second conveyor leading to another manufacturing stage, the apparatus comprising:
   a frame having a first axis;
   an elongated slide guide fixed to the frame;
   a slider mounted in the slide guide for reciprocal movement parallel to said first axis between a first position and a second position spaced from the first position;
   a sprocket wheel rotatably mounted in the frame;

a chain guide having a semicircular portion centered on a second axis perpendicularly intersecting the first axis at said second position;

an endless chain trained around the sprocket wheel and the semicircular portion of the chain guide, the chain extending in a path including first and second rectilinear portions between the sprocket wheel and the chain guide, the rectilinear portions being connected by a semicircular portion conforming to the semicircular portion of the chain guide;

a reversible drive device connected to the sprocket wheel for rotating the sprocket wheel selectively in one of a forward direction and a reverse direction;

a workpiece retaining arm having a base end and an outer end, the base end being pivotally connected to the slider for rotation about a third axis perpendicular to the first axis and parallel to the second axis;

means for connecting the workpiece retaining arm to the endless chain such that movement of the chain in the forward direction causes the retaining arm connecting means to follow the first rectilinear portion of the chain path and to move the slider from said first position to said second position, continued movement of the chain in the forward direction causes the retaining arm connecting means to follow the semicircular portion of the chain path and the workpiece retaining arm to pivot 180 degrees about said third axis, and still further movement of the chain in the forward direction causes the retaining arm connecting means to follow the second rectilinear portion of the chain path and the slider to return from said second position to said first position;

a workpiece clamping device connected to the workpiece retaining arm for clamping a workpiece and for inverting said workpiece when the retaining arm is pivoted 180 degrees;

means for actuating said workpiece clamping device for selectively clamping and unclamping a workpiece when the slider is at said first position;

first means for switching the reversible drive device to the forward direction when the slider is at said first position and the connecting means for the workpiece retaining arm is located on the first rectilinear portion of the chain path; and second means for switching the reversible drive device to the reverse direction when the slider is at said first position and the connecting means for the workpiece retaining arm is located on the second rectilinear portion of the chain path.

2. An apparatus according to claim 1, the apparatus further comprising:

means for switching the reversible drive means selectively to the reverse direction when the slider is near said second position and the connecting means for the workpiece retaining arm is located on said first rectilinear portion of the chain path for selectively returning the slider to said first position from said second position without inverting a workpiece carried by said workpiece clamping device.

3. An apparatus according to claim 2 wherein said third means for switching the reversible drive device selectively to the reverse direction comprises:

a position detection device for selectively detecting the presence of the connecting means for the workpiece retaining arm on the first rectilinear portion of the chain path near said second position of the slider.

4. An apparatus according to claim 3 wherein said position detection device comprises:

a limit switch and means for mounting said limit switch selectively at either of a first switch position, wherein the limit switch is actuated by the presence of the connecting means for the workpiece retaining arm on the first rectilinear portion of the chain path near said second position of the slider, and a second switch position, wherein the limit switch cannot be actuated by the connection means for the workpiece retaining arm.

5. An apparatus according to claim 1 wherein said first means for switching the reversible drive device to the forward direction comprises:

a first position detection device for detecting the presence of the connecting means for the workpiece retaining arm on the first rectilinear portion of the chain path near said first position of the slider.

6. An apparatus according to claim 5 wherein said second means for switching the reversible drive device to the reverse direction comprises:

a second position detection device for detecting the presence of the connecting means for the workpiece retaining arm on the second rectilinear portion of the chain path near said first position of the slider.

7. An apparatus according to claim 6 wherein each of said first and second position detection devices comprises a limit switch.

8. An apparatus according to claim 6 wherein each of said first and second position detection devices comprises a photoelectric detection device.

9. An apparatus according to claim 1 wherein said chain guide comprises a sprocket wheel mounted in said frame for rotation about said second axis.

10. An apparatus according to claim 1 wherein said slide guide comprises a guide notch extending parallel to said first axis, and said slider is mounted to move slidably in said guide notch.

11. An apparatus according to claim 1 wherein the means for actuating said workpiece clamping device comprises a cylinder clamping mechanism.

* * * * *